United States Patent Office 3,085,514
Patented Apr. 16, 1963

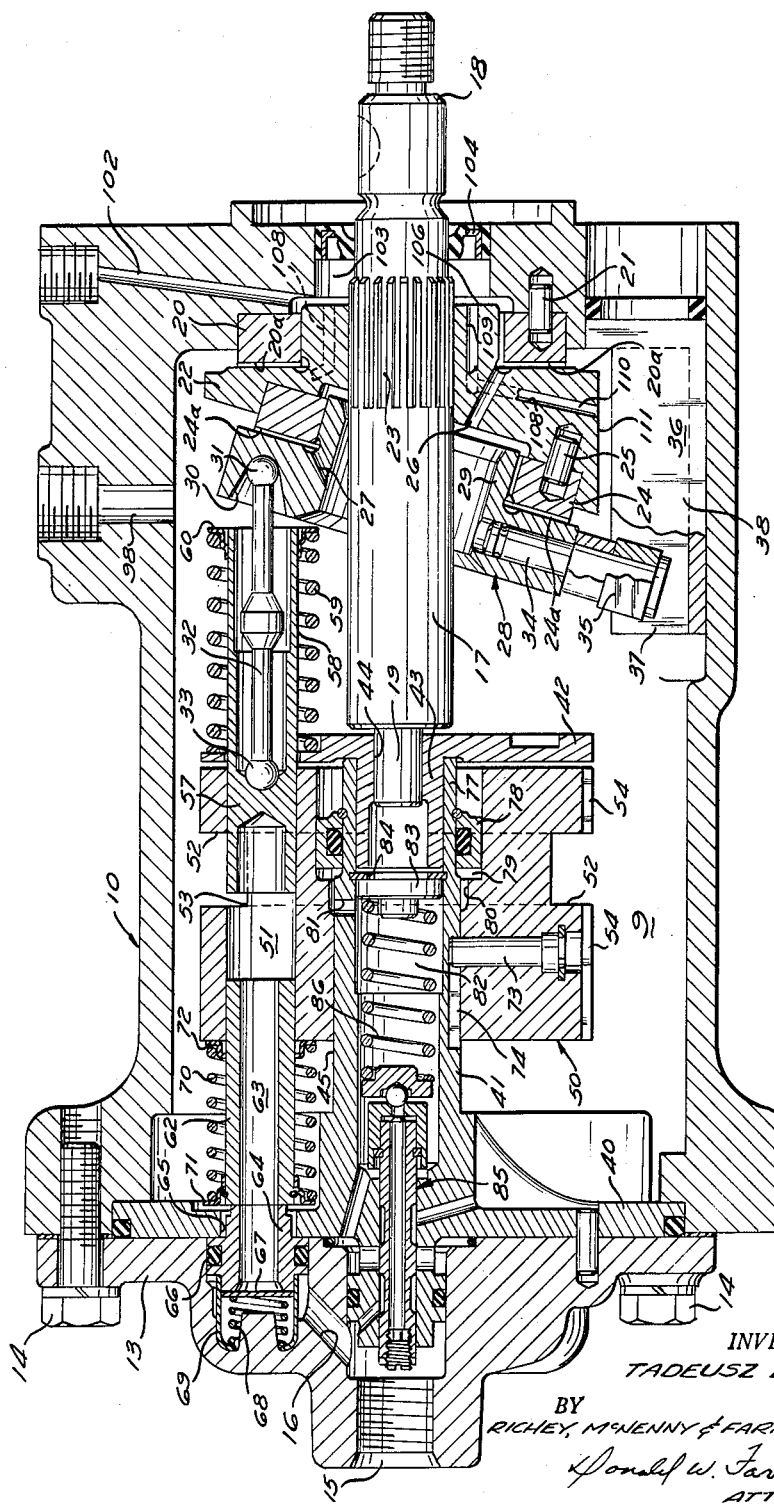

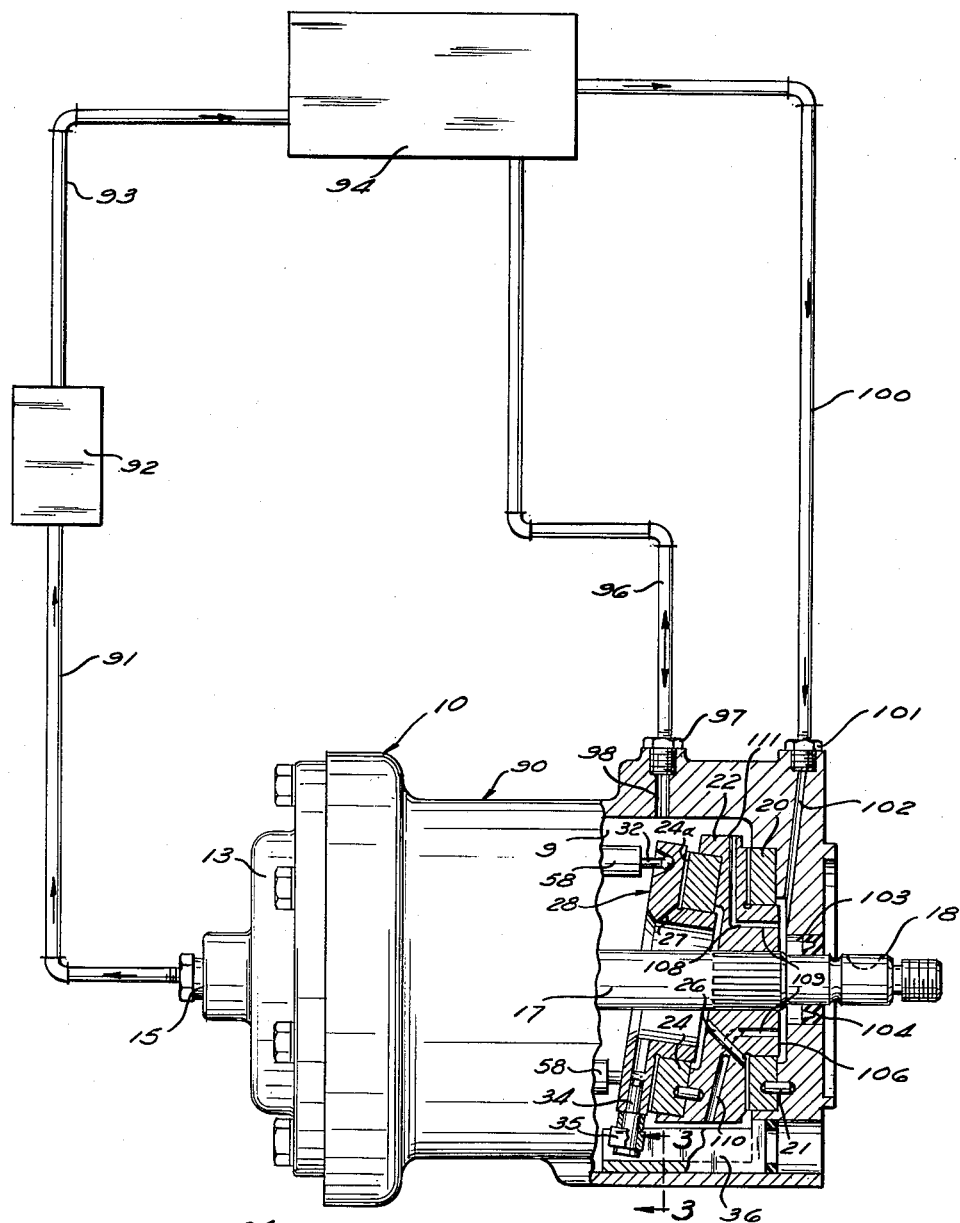
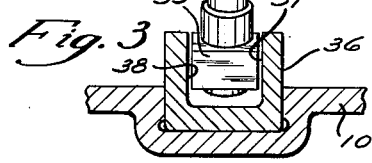

3,085,514
PUMP COOLING APPARATUS
Tadeusz Budzich, Shaker Heights, Ohio, assignor to The Weatherhead Company, Cleveland, Ohio, a corporation of Ohio
Filed June 7, 1960, Ser. No. 34,571
5 Claims. (Cl. 103—173)

This invention relates generally to hydraulic pumps, and more particularly to the cooling of variable displacement hydraulic pumps during operation at or near minimum output volume.

The problem of cooling hydraulic pumps has been particularly great in the case of positive, variable displacement pumps. Not only do pumps of this type tend to generate a considerable amount of friction between their relatively large number of moving parts, but also, since these pumps are able to restrict the volume of fluid passing through them, there is generally an insufficient amount of flow of hydraulic fluid through the pump at or near the minimum volume or cut-off point to cool the internal parts of the pump. Under the conditions of normal fluid output flow, the fluid passing through the pump is able to absorb sufficient heat to maintain the pump within permissible operating temperatures. The heating of the hydraulic fluid within the pump is normally not objectionable because the temperature of the fluid does not increase excessively and the absorbed heat is readily dissipated as the fluid circulates through the other portions of the fluid system. However, when such pumps are operated at or near full cut-off, the output volume of the pump is small or non-existent, and the reduction in the volume of fluid flow accordingly results in the fluid being heated to considerably higher temperatures than those occurring at the normal volume of fluid flow. Under these conditions, the pump may be damaged not only because the high temperature can affect heat sensitive parts such as bearings and springs, but also because the heat may cause a detrimental decrease in the viscosity of the fluid in the pump. Where the fluid being pumped serves as the lubricant for the internal pumping mechanism, this decrease in viscosity may be great enough to cause lubrication failure in highly loaded bearings such as plain thrust bearings.

Heretofore it has been necessary to provide an external cooling system for variable displacement pumps whenever they are used under conditions in which this overheating may occur. These separate cooling systems necessarily add to the cost, size, and weight of the pump, and since they must be separately powered, their power consumption lowers the overall efficiency of the hydraulic system. As a result of this heating problem, there have been many applications in which variable displacement hydraulic pumps have not been used, in spite of the many advantages they present over more complicated systems such as those employing a constant displacement pump together with a separate throttling and control unit.

A principal object of the present invention is to provide in a variable displacement pump a cooling system whereby fluid is continually recirculated between the pump and the supply reservoir to insure the circulation of a sufficient volume of fluid through the pump to cool the pump whenever the circulation resulting from normal output from the pump is insufficient to provide adequate cooling.

Another object of the present invention is to provide a cooling arrangement for a variable displacement pump as described in the preceding object in which the cooling apparatus is self contained within the pump, reservoir and connecting conduits without any additional external equipment.

Another object of the present invention is to provide a variable displacement hydraulic pump which incorporates a built-in secondary pump which circulates fluid for cooling purposes when the normal flow through the pump is insufficient to provide the necessary cooling action. So long as the driving mechanism rotates, fluid is continually pumped into the pump housing through the action of the secondary pump, the output of the secondary pump being available either as an input to the main pump, or if not required for that purpose, to be automatically recirculated back to the reservoir to dissipate the heat absorbed within the pump.

Still another object of the present invention is to provide a variable displacement pump incorporating built-in cooling circulation as set forth in the foregoing objects in which the amount and the path of flow of the cooling circulation is automatically determined in response to changes in the output volume of the pump.

Yet another object of the present invention is to provide in a variable displacement pump means to circulate fluid for cooling to provide a separate cooling flow path through the pump whenever the volume of flow resulting from the output of the pump is insufficient to provide adequate cooling action, and in which the cooling circulation along this path does not limit or detract from the pump capacity and ceases when the volume of fluid required for the output from the pump exceeds the volume of fluid flowing along the cooling path.

The foregoing objects and advantages are realized in the preferred embodiment of the invention which is shown and described herein. Briefly, the pump is of the wobble or swash plate type in which the wobble plate reciprocates a plurality of axially aligned pistons within cylinders having a variable effective displacement which is regulated to determine the output volume of the pump. The drive member for the wobble plate is provided with passages having radially extending portions which serve as a centrifugal pump when the drive member is rotating. The main intake for the pump from the fluid reservoir opens into the interior of the pump housing, as do the outlet ends of the centrifugal pump passages in the drive member. A secondary or cooling fluid inlet pipe extends from the reservoir to the radially inner end or inlet side of these passages, so that centrifugal force on the fluid within the passages tends to pump fluid from the reservoir cooling inlet into the body of the pump.

If the pump is operating at a relatively high fluid output, the combined flow from both the cooling inlet and the main inlet is used to supply the pump output. When the output from the pump is less than that of fluid supplied to the pump as a result of the pumping action of the centrifugal pump unit, the normal direction of fluid flow is reversed so that fluid no longer enters through the main inlet but flows outward through this inlet back into the storage reservoir where the heat which the fluid has absorbed from the running parts of the pump can be dissipated. Thus, even though there is no fluid output resulting from the pumping action of the pump cylinders, there is still a flow of fluid both through the pump and between the pump and the reservoir as a result of the pressure differential created by the secondary or centrifugal pump.

Additional objects and advantages of the present invention will be readily discerned by those skilled in the art upon an examination of the accompanying drawings of the preferred embodiment of the invention which is described in greater detail in the following detailed specification.

In the drawings:

FIG. 1 is a longitudinal cross-sectional view of a variable displacement pump incorporating the present invention;

FIG. 2 is a schematic diagram of a hydraulic system incorporating the pump of FIG. 1; and FIG. 3 is a fragmentary cross-sectional view taken on line 3—3 of FIG. 2.

Referring to the drawings in greater detail, FIG. 1 shows a pump of the type disclosed and claimed in the following copending applications by the same inventor and assigned to the same assignee: Serial No. 825,005, filed July 6, 1959; Serial No. 847,512, filed October 20, 1959; and Serial No. 17,832, filed March 28, 1960. It is understood however that the present invention is applicable to other pumps, the particular type shown and described herein being for purposes of illustration only.

The pump includes a housing or body 10 which is generally cup shaped to form a chamber 9 containing the pump mechanism. A cover plate 13 is fitted over the open end of the pump housing 10 and held in place by suitable bolts 14. Centrally located in cover plate 13 is the high pressure outlet 15. A drive shaft 17 projects outwardly through the other end of the pump housing 10 and the projecting end portion 18 is adapted to receive a pulley or chain sprocket (not shown) for rotating the shaft 17.

An annular bearing member 20 is mounted within the pump housing surrounding the drive shaft 17 and is secured against rotation by a dowel pin 21 fixed in the housing. The cylindrical inner surface of the bearing member 20 serves to rotatably journal the drive member 22, and the radial face of bearing 20 serves as an axial thrust bearing for the corresponding radial face of the drive member 22. The drive member 22 is drivingly secured to the drive shaft 17 by the splined connection indicated at 23. This splined connection is made relatively loose to allow the drive member 22 to tilt slightly and adjust to the driving load and maintain a lubricating film between the bearing surfaces. Drive member 22 has an annular pocket to receive an inclined or axially eccentric bearing member 24 which is pinned to the drive member 22 to rotate therewith by a suitable dowel pin 25.

The annular bearing member 20 is provided with radial grooves 20a on its face adjacent drive member 22. A bore 26 extends through drive member 22 to a point adjacent the inner end of the radial grooves 20a. As the drive member 22 rotates, the fluid in bore 26 moves outward by centrifugal force to maintain a continual fresh supply of fluid to radial grooves 20a for lubricating the thrust bearing surface between the bearing member 20 and drive member 22.

A piston rod driver or wobble plate, indicated in its entirety at 28, includes a sleeve portion 29 journaled on the inner periphery of the bearing member 24. The wobble plate 28 is provided with cup portions 30 spaced about its exposed face, each cup being adapted to receive the ball shaped end 31 of a piston rod 32. The wobble plate 28 includes a radial bearing face abutting against a similar radial face on the bearing member 24 to take axial thrust loads. Radial grooves 24a are provided on the face of the inclined bearing member 24 adjacent the wobble plate 28, and at their inner ends these radial grooves 24a communicate with a bore 27 passing radially through the wobble plate 28. As drive member 22 and inclined bearing member 24 rotate, the centrifugal force within the radial grooves 24a forces the fluid within these grooves outward and draws fresh fluid inward through the bore 27 to maintain a continual fresh supply of lubricant to the thrust bearing surface between the inclined bearing member 24 and wobble plate 28.

It will be understood that the pump has a plurality of cylinders and pistons arranged in a circular array about an axis defined by drive shaft 17 and extending parallel thereto. Accordingly, the wobble plate 28 has other cup portions similar to cup 30 spaced around its outer face to receive the ends of other piston rods. The structure of these other piston rods and cylinders is the same as that shown in FIG. 1, and therefore they will not be described further.

The drive member 22, together with bearing member 24, rotates with the drive shaft 17, while the wobble plate 28 is restrained against rotation in the housing. The restraining means includes a pin 34 carried by the wobble plate 28 and projecting downwardly therefrom. The lower end of pin 34 carries a bearing block 35 of square cross section and which is adapted to ride between the walls of a guide member 36 fitted within the pump housing 10. The walls of guide member 36 are indicated at 37 and 38, respectively, and such walls extend parallel to the axis of drive shaft 17 spaced apart a distance substantially equal to the width of the bearing block 35 which makes a sliding contact therein. When the drive shaft 17 is rotated, the drive member 22, through its bearing member 24, progressively tilts the wobble plate 28 with the result that each of the piston rods 32 is reciprocated through a stroke determined by the amount of inclination of bearing member 24 with respect to the axis of drive shaft 17.

During the operation of the pump, the interior of the pump housing 10 is filled with hydraulic fluid at all times through the inlets described in detail hereinafter, and this unpressurized fluid is available for introduction to the pumping cylinders.

At the end of the pump housing 10, which is covered by cover plate 13, an end plate 40 is clamped in position in the end of the housing within an annular recess on the end face of the pump housing 10 by means of the adjacent cover plate 13. This end plate 40 is provided with an integrally formed tubular guide member 41 which is disposed centrally of the housing 10 and is aligned with the drive shaft 17. Another plate 42 has a sleeve portion 43 mounted within the open end of the tubular guide member 41, and this plate member 42 is provided with an axial bore 44 which serves as a bearing for the innermost end 19 of drive shaft 17.

The cylinder block, indicated in its entirety at 50, is provided with a central bore and is mounted for sliding movement on the outer cylindrical bearing surface 45 of the tubular guide member 41. The cylinder block 50 is provided with a plurality of identical cylinders, such as cylinder 51, spaced about the cylinder block in axial alignment with the cups on wobble plate 28. The cylinder block 50 is provided with an annular loading groove 52 formed in the cylinder block at the exterior thereof so as to provide an inlet port for the cylinders 51 as indicated at 53. The exterior of the cylinder block 50 is preferably grooved axially at 54 to facilitate entry of the fluid into the loading groove 52. The cylinder 51 extends from end to end through cylinder block 50 and at the end adjacent plate 42 it is fitted with a piston 57. The piston 57 has a tubular skirt portion 58 and is biased toward the wobble plate 28 by means of a spring 59 which surrounds the tubular skirt portion 58 of piston 57. One end of the spring 59 bears against a flange 60 secured on the extreme end of the piston skirt portion 58. The other end of spring 59 bears against the plate 42. The opposite end 33 of piston rod 32 is fitted in a ball-shaped socket formed within piston 57 so that the major portion of piston rod 32 lies within the hollow skirt portion 58.

Within the other end of cylinder 51 opposite the piston 57 is a tubular reaction piston 62. The outer diameter of reaction piston 62 corresponds substantially to the bore of the cylinder 51, while the inner diameter of the hollow bore 63 within reaction piston 62 is in alignment with a port sleeve 64 which projects into the pump housing through an opening 65 in the end plate 40. The end of port sleeve 64 remote from the reaction piston 62 bears against the underside of a check valve plate 67 which is biased to the closed portion against port sleeve 64 by a compression spring 68 carried within a supporting cage 69. The port sleeve 64 together with check valve plate 67, spring 68 and cage 69 are preferably assembled within the end cover plate 13 before the latter is secured to the pump housing, and accordingly the port sleeve 64 is sealed from leakage by means of an O-ring seal 66. The reaction piston 62 is biased into contact with the port sleeve 64 by means of a compression spring 70 which surrounds the reaction piston. A spring retaining flange 71 is secured on the end of reaction piston 62 adjacent port sleeve 64 and serves as an abutment for one end of the spring 70. The other end of spring 70 abuts against a thrust ring 72 which in turn exerts a thrust against the end face of the cylinder block 50. Thus the arrangement of the springs 70 for all of the cylinders is such that while the reaction of the individual springs in one direction biases the respective reaction pistons into contact with the respective port sleeves, the combined reaction of the springs in the other direction biases the cylinder block 50 away from the cover plate 13 and toward the plate 42. The cylinder block 50, although axially slidable, is secured against rotation about the tubular guide portion 41 by means of a guide pin 73 which extends axially inward through the cylinder block 50 to ride within an axial groove 74 on the outer surface of tubular guide member 41.

Assuming the cylinder block is in the position shown in FIG. 1, and the drive shaft 17 is rotated, the pumping piston 57 will be reciprocated within the cylinder 51. When the piston 57 is in the retracted position shown in FIG. 1, fluid is admitted from the interior of the housing through the inlet port section 53 and into the cylinder 51. As the piston 57 moves axially on its pumping stroke, during the initial portion the fluid within cylinder 51 is forced outward through port 53 until the latter is closed by the piston, after which the fluid trapped between the piston and the check valve 67 is discharged through the check valve 67 and from there through a connecting passage 16 to the high pressure outlet 15.

It will be understood that by moving the cylinder block 50 axially along the guide member 41 within the housing, the effective closing position of the inlet port 53 is changed. As the cylinder block 50 is moved to the left as shown in FIG. 1, the effective pumping displacement will be progressively reduced, because the inlet port will be closed by the piston at progressively later portions in the pumping stroke. Conversely, when the cylinder block 50 is moved to the right toward the position illustrated in FIG. 1, a condition of maximum displacement is progressively approached.

Adjacent the plate 42, the guide member 41 is provided with a reduced portion 77 on which is mounted an annular member 78 which forms an abutment or reaction member of a fluid piston and cylinder arrangement which is utilized for moving the cylinder block 50 axially against the combined forces of the springs 70. An annular reaction chamber 79 is formed between the inner diameter of the cylinder block 50 and the outermost diameter of the reduced portion 77. An annular passageway 80 leads from the annular chamber 79 and connects to a port 81 leading into the hollow chamber 82 within the tubular guide member 41. A suitable plug 83 is held within the chamber 82 outward of connecting port 81 by means of a snap ring 84, and therefore closes off the chamber 82 from the axial bore portion 44 in plate 42 while maintaining the chamber 82 in open communication with the reaction chamber 79 utilized for moving the cylinder block 50 to different displacement positions.

A cylinder block control valve, indicated in its entirety at 85, is arranged coaxially of the end plate 40 and tubular guide member 41. This valve serves to introduce fluid at the outlet pressure into the chambers 82 and 79 so as to move the cylinder block 50 to reduce the pump displacement, or alternately to exhaust fluid from the chambers 82 and 79 and thereby allow the springs 70 to move the cylinder block 50 to increase the pump displacement. The operation of this cylinder block control valve 85 is explained in full detail in the present inventor's co-pending application Serial No. 847,512, filed October 20, 1959, and previously referred to hereinabove. In brief, the control valve 85 operates under a balance between the pressure within the high pressure outlet 15 and the pressure in chamber 82 plus the force exerted by compression spring 86 within chamber 82 to control the fluid flow to and from and thereby regulate the effective displacement of the pump as determined by the position of the cylinder block 50, in such a manner that the effective displacement of the pump will produce an output volume equal to the output demand at the high pressure outlet 15, and such displacement will automatically be adjusted according to variations in demand without variation in the present output pressure of the pump as determined by the setting of the cylinder block control valve, all as described in greater detail in the co-pending application referred to above.

It will be seen from the above description that the pump of FIG. 1 is adapted to operate at a relatively constant output pressure and is to vary the volume of output as required by the load. The hydraulic fluid is taken from the chamber 9 within the pump housing 10 through the loading groove 52 and inlet port 53 into the pump cylinder 51. The actual output volume produced by a single reciprocation of the piston 57 through its stroke is varied without varying the length of stroke by varying the length of the working portion of the stroke by the movement of the cylinder block 50. Thus, when the cylinder block 50 is in the position shown in FIG. 1, the piston 57 has to move only a short distance to cover the inlet port 53 so that almost the entire stroke is used to create the output volume of the pump. On the other hand, when the cylinder block 50 is shifted to the opposite position against the compression of springs 70, the inlet port 53 then is more nearly adjacent the end of the reaction piston 62. In this position, the inlet port 53 will not be covered or closed by the piston so that the movement of the piston produces no effective output volume from the pump.

In the condition where there is no output volume from the pump, the pistons still move through their full stroke and the amount of frictional heat produced under these conditions is nearly as large as when the pump is operating at full output. In addition, the oil within the pump housing 10 is heated by virtue of the agitation produced by the mechanical movement of the pistons churning the oil in and out of the loading groove 52 as well as by the movement of the wobble plate 28 and the drive member 22. Although this churning of the oil by the moving parts produces a certain amount of circulation of the oil within the pump housing 10, the heat dissipation away from the pump by means of radiation from the pump housing is insufficient to maintain the pump at the desired operating temperature.

The manner in which the pump is cooled in accordance with the present invention may be best seen in conjunction with the schematic showing of FIG. 2. The pump, indicated generally by the numeral 90, has an output line 91 connected to the high pressure outlet 15 and extending to the load indicated generally at 92. The load 92 is in turn connected by a return pipe 93 to the usual hydraulic tank or supply reservoir 94 having a sufficient capacity to allow dissipation of the heat absorbed by the hydraulic fluid within the pump 90 and within the load 92.

The reservoir 94 is connected to the pump to provide the inlet fluid supply thereto by means of two separate lines. One of these, the main intake line 96, extends from reservoir 94 to a fitting 97 on the pump housing 10 and a short passage 98 which opens directly into the chamber 9 within the pump housing 10. As will be described in greater detail hereinafter, whenever the pump is operating in the normal output volume range, fluid will flow inward through the main intake line 96 from the reservoir into the chamber 9 within the pump housing 10 to be available for supply to the pumping cylinders through the loading groove 52.

A secondary intake line 100 also extends from the reservoir 94 to the pump 90 and is secured by a suitable fitting 101 on the end of pump housing 10 opposite to that enclosed by cover plate 13. A connecting passage 102 extends from fitting 101 to an annular chamber 103 surrounding the drive shaft 17. This annular chamber 103 is closed off radially by the drive shaft 17 and pump housing 10 together with the bearing member 20. Axially, the annular chamber 103 is closed off on the outside by an oil seal 104 making a sealing fit around drive shaft 17 and by the radial face 106 on the drive member 22. The drive member 22 is provided with several internal fluid passages 108 each having an axially extending portion 109 which opens into annular chamber 103 along radial face 106. These passages 108 also have radially extending portions 110 extending outward from the axial portions 109 and opening on the outer periphery 111 of drive member 22 into the chamber 9 within pump housing 10. It will therefore be seen that whenever the drive member 22 is rotating while the pump is in operation, centrifugal force will be imparted to the fluid within the passages 108 along the radial portions 110 thereby causing a flow of fluid from the annular chamber 103 into the chamber 9 within the pump housing 10.

Under full cut-off conditions, where there is no fluid flow outward through the outlet 15, there would be no flow through the main intake line 96 were the secondary intake line 100 not connected. However, with the secondary intake line 100 present, a higher pressure is created within chamber 9 in pump housing 10 than exists within the annular chamber 103 because of the centrifugal force imparted to the oil within passages 108. This pressure differential therefore causes fluid which flows inward through the secondary intake 100 to flow outward from the pump housing chamber through the main intake line 96 back into the reservoir 94. Thus with no output flow from the pump itself, there is a circulation of oil between the reservoir 94 and the pump housing chamber 9 through the two intake lines 100 and 96. Thus cool oil from the reservoir 94 enters through the pump through the secondary intake line 100 into annular chamber 103, after which it is pumped through passages 108 into the pump housing chamber 9 to absorb the heat therein. Then the heated oil passes outward through main intake line 96 and back into the reservoir 94 to dissipate the heat absorbed within the pump.

The centrifugal pumping action produced by the rotation of the passages 108 produces a constant pressure differential for a fixed speed of rotation of the drive shaft 17 and drive member 22. This pressure therefore causes a definite rate of fluid flow through the intake lines 96 and 100 dependent upon the restriction within those lines. When the load 92 draws a relatively small volume of fluid from the pump 90, this volume of hydraulic fluid will be supplied from the pump housing chamber 9, and therefore the fluid which is used for the output flow from the pump will not flow back toward the reservoir through the main intake line 96, thereby lowering the rate of reverse flow through this line.

If the output flow from the pump equals the intake flow through the secondary intake line 100 through the pumping action of the passages 108, all of the fluid taken in through secondary intake line 100 and thereby passing into pump housing chamber 9 will be pumped out through the pumping mechanism with the result that there will be no flow in either direction through the main intake line 96. If the rate of output flow of the pump is increased beyond this point, the intake through secondary line 100 is unable to supply sufficient fluid to the pump housing chamber 9 to meet the output requirements, and this difference will be made up by forward or inward flow through the main intake line 96 from reservoir 94 into the pump housing chamber 9. When the pump operates at maximum output volume, it will be seen that fluid is supplied both from the main intake line 96 and the secondary intake line 100.

Thus, there will be an input flow through the secondary intake line 100 from the reservoir 94 into the pump housing chamber 9 at all times during pump operation when the drive shaft 17 is rotating, regardless of whether the output volume from the pump is at the maximum or minimum or any point therebetween. However, the flow through the main intake line 96 varies both as to volume and direction of flow depending upon the amount of output volume from the pump.

From the above description, it will be seen that this invention provides a cooling fluid circulation through the pump housing at low or zero pump discharge flow, and that this minimum cooling capacity is determined both by the rotational speed of the pump and by the size of the passages through the secondary intake line 100, annular chamber 103, and passages 108. By virtue of the intake of cool fluid entering at the annular chamber 103 and passing through the passages 108 and in the drive member 22, the cooling fluid is introduced at the point of maximum generation of heat at the pump drive bearings 20 and 24. By cooling the drive member 22 which is in contact with both the bearing members 20 and 24, both of these bearing members and the bearing surfaces between them are maintained at a cool temperature for proper lubrication.

While a preferred embodiment of the invention has been shown and described, it is contemplated that the teachings of this invention may be adapted to other types of pumps and in other arrangements as will be understood by those skilled in the art, and that such adaptations and modifications and rearrangements may be made without departing from the scope of the invention as defined in the claims.

What is claimed is:

1. In a pump including a housing, said housing having a fluid chamber therein, a rotatable shaft journaled on bearing surfaces in said housing, an outlet from said housing, variable displacement pump means in said housing driven by said rotatable shaft to pump fluid from said fluid chamber through said outlet, a fluid supply reservoir, an inlet to said fluid chamber connected to said reservoir, a centrifugal pump in said housing and driven by said rotatable shaft to provide a continuous flow of cool fluid through said fluid chamber and to the bearing surfaces, said centrifugal pump having a separate inlet connected to said reservoir, said centrifugal pump having an outlet opening into said fluid chamber whereby the output of said centrifugal pump flows to said variable displacement pump means and also flows through said first mentioned inlet to said reservoir only when the flow from said variable displacement pump means is less than the flow from said centrifugal pump.

2. In a pump mechanism including a housing, a fluid supply reservoir, a drive shaft journaled on bearing surfaces in said housing, a variable displacement pump within said housing and driven by said drive shaft, said variable displacement pump having a high pressure outlet, said variable displacement pump having an inlet, first conduit means connecting said inlet to said reservoir, a centrifugal pump member within said housing and driven by said drive shaft to provide a flow of cool fluid through said housing and to the bearing surfaces, said pump member having a passage extending therethrough, said passage having a radially extending portion connected at the outer end to the inlet of said first pump means and to said first conduit means, said passage having an axially extending portion, and second conduit means connecting said axially extending portion to said reservoir whereby fluid flows in said second conduit means from said reservoir to said passage and flows out of said passage to said variable displacement pump inlet and to said reservoir through said first conduit means only when the flow from said variable displacement pump is less than the flow from said centrifugal pump member.

3. In a pump including a housing, said housing having a fluid chamber therein, a drive member rotatably journaled on bearing surfaces in said housing, an annular bearing surface on said drive member inclined to the axis of rotation thereof, a wobble plate in driven engagement with said annular bearing surface on said drive member, variable displacement pump means in said housing driven by said wobble plate, said variable displacement pump means having a high pressure outlet, said variable displacement pump means having an inlet connected to said fluid chamber, a fluid supply reservoir, first conduit means connecting said reservoir to said fluid chamber, a passage in said drive member adapted to act as a centrifugal pump during rotation of said drive member to provide a continuous flow of cool fluid through said fluid chamber and to the bearing surfaces, said passage having a radial portion opening at its outer end into said fluid chamber, said passage having an axially extending portion at the inner end of said radial portion, and second conduit means connecting said axially extending portion to said reservoir whereby fluid flows in second conduit means from said reservoir to said passage and fluid flows in said first conduit means from said fluid chamber to said reservoir when the flow from said high pressure outlet is less than the flow in said second conduit means.

4. In a pump including a housing, said housing having a first fluid chamber therein, a drive member rotatably journaled on bearing surfaces in said housing, an annular bearing surface on said drive member inclined to the axis of rotation thereof, a wobble plate in driven engagement with said annular bearing surface on said drive member, variable displacement pump means in said housing driven by said wobble plate, said variable displacement pump means having a high pressure outlet, said variable displacement pump means having an inlet connected to said first fluid chamber, a fluid supply reservoir, said housing having a second fluid chamber therein, first conduit means connecting said reservoir to said first fluid chamber, a centrifugal pumping passage in said drive member to provide a continuous flow of cool fluid through said fluid chamber and to the bearing surfaces, said passage having a radial portion opening at its outer end into said first fluid chamber, said passage having an axially extending portion at the inner end of said radial portion opening into said second fluid chamber, and second conduit means connecting said reservoir to said second fluid chamber whereby fluid flows in said second conduit means from said reservoir to said second fluid chamber and to said pumping passage and fluid flows in said first conduit means from said first fluid chamber and to said reservoir only when the flow from said high pressure outlet is less than the flow in the said second conduit means to the second fluid chamber.

5. A pump comprising an elongated housing, a cylinder block in the housing, a plurality of cylinders in the block parallel to each other, said cylinders having an outlet on said housing and an inlet from said housing, a drive shaft journaled on bearing surfaces in the housing, an eccentric on said drive shaft in the housing, pistons in said cylinders, a cam face on said eccentric, cam follower means to drive said pistons, that side of the eccentric opposite the cam face being spaced from the wall of the housing around the drive shaft to form an inlet chamber, passageways in the eccentric leading from said inlet chamber to the outer periphery of the eccentric to provide a centrifugal pump to circulate fluid from said inlet chamber to said housing, a fluid reservoir having two conduits leading from the reservoir to the pump housing, one conduit terminating at said inlet chamber to conduct fluid from said reservoir to said eccentric for cooling purposes and the other conduit terminating on said housing at the opposite side of the eccentric to conduct fluid from said centrifugal pump passageways to said reservoir only when the flow from said outlet is less than the flow through said centrifugal pump passageways to insure a continuous circulation of cool fluid through said housing and to said bearing surfaces at all times during rotation of said drive shaft.

References Cited in the file of this patent
UNITED STATES PATENTS

| | | |
|---|---|---|
| 695,232 | Reynolds | Mar. 11, 1902 |
| 1,517,665 | Chase | Dec. 2, 1924 |
| 2,385,990 | Huber | Oct. 2, 1945 |
| 2,392,543 | Mercier | Jan. 8, 1946 |
| 2,461,279 | Huber | Feb. 8, 1949 |
| 2,518,618 | Huber | Aug. 15, 1950 |
| 2,620,733 | Overbeke | Dec. 9, 1952 |
| 2,661,700 | Towler et al. | Dec. 8, 1953 |